United States Patent [19]
Parker et al.

[11] Patent Number: 6,031,602
[45] Date of Patent: Feb. 29, 2000

[54] METHOD AND APPARATUS FOR INSPECTING OR TESTING A SAMPLE BY OPTICAL METROLOGY

[75] Inventors: Steve C. J. Parker; Phillip L. Salter, both of Bristol, United Kingdom

[73] Assignee: British Aerospace Public Limited Company, Farnborough, United Kingdom

[21] Appl. No.: 09/069,329

[22] Filed: Apr. 29, 1998

[30] Foreign Application Priority Data

Apr. 30, 1997 [GB] United Kingdom .................. 9708651

[51] Int. Cl.[7] .................................................. G01B 9/02
[52] U.S. Cl. ............................... 356/35.5; 356/353
[58] Field of Search ........................ 356/32, 35.5, 345, 356/353, 376, 237.1; 73/800; 348/125, 128

[56] References Cited

U.S. PATENT DOCUMENTS

| | | | |
|---|---|---|---|
| 4,682,892 | 7/1987 | Chawla | 356/353 |
| 5,091,776 | 2/1992 | Tyson, II | 356/35.5 |
| 5,094,528 | 3/1992 | Tyson, II et al. | 356/353 |
| 5,257,089 | 10/1993 | Stetson | 356/353 |
| 5,481,356 | 1/1996 | Pouet et al. | 356/35.5 |

FOREIGN PATENT DOCUMENTS 2 307 550   5/1997   United Kingdom ............. G01B 9/02

OTHER PUBLICATIONS

Phase–stepped speckle shearing interferometer by source wavelength modulation; J.R. Huang, et al, 1996 Optical Society of America, Sep. 15, 1996, vol. 21, No. 18/Optics Letters, pp. 1421–1423.

*Primary Examiner*—Hoa Q. Pham
*Attorney, Agent, or Firm*—Kenyon & Kenyon

[57] ABSTRACT

A sample (1) is inspected or tested by illumination in which a line of coherent radiation (2) is scanned across the sample (1) with zero shear in the direction of scan. Two laterally displaced images of the sample (1) are generated which are phase stepped by stepping or ramping the phase of one of the two images during each of the line scans so that successive lines are incremented in phase to encode temporally information about the sample in one frame. The encoded information is decoded by running a vertical convolution mask (17) over the encoded frame image.

7 Claims, 2 Drawing Sheets

METHOD AND APPARATUS FOR INSPECTING OR TESTING A SAMPLE BY OPTICAL METROLOGY

FIELD OF THE INVENTION

This invention relates to a method and apparatus for inspecting or testing a sample, such as an aircraft skin panel, by optical metrology and is particularly, but not exclusively, concerned with such a method and apparatus applicable to optical non-destructive testing by shearography for aerospace components.

BACKGROUND OF THE INVENTION

Coherent optical techniques such as holography, interferometry, electronic speckle pattern interferometry (ESPI), speckle interferometry, particle image velocimetry (PIV) and shearography are currently being utilised for applications such as non-destructive testing (NDT), vibration analysis, object contouring, stress and strain measurement, fatigue testing, deformation analysis and fluid flow diagnosis. All these techniques have associated drawbacks with performance being to some extent a trade off against specific disadvantages inherent in the individual techniques.

For example shearography has high sensitivity and tolerance to environmental noise but is of limited application because of difficulties in inspecting large areas due to inefficiencies in the laser power available and optical beam expansion and delivery systems. Additional problems are encountered with a relatively low signal to noise ratio.

Coherent optical techniques produce an image of the test piece sample that is overlaid with interference fringes (bands of high and low intensity). Depending on which technique is being applied, these fringes denote, for example, loci of displacement, strain, air density. The fringes are produced by subtracting speckle images, or reconstructed wavefronts, of a sample that has undergone some form of deformation between the two exposures. With speckle techniques the subtraction is usually performed electronically using a Charge Coupled Device (CCD) camera, framestore and computer, whereas with holographic interferometry the subtraction occurs when two reconstructed wavefronts (or one actual scattered wavefront and one reconstructed wavefront) are made to interfere. The resulting fringe pattern contours this deformation.

In practice, it is difficult to extract quantitative physical information from fringe patterns. Direct data extraction requires automated fringe tracking and interpolation. This process is fraught with problems due to variations in illumination and object reflectance. In addition, with infinite fringe patterns, that is fringes visible when the sample is undistorted, it is impossible to determine whether the phase is increasing or decreasing between adjacent fringes. Two methods have been proposed to remove this ambiguity and offer varying degrees of noise tolerances.

The first known phase extraction technique known as phase stepping involves capturing a sequence of separate interferometric images, as the phase of one of the interfering wavefronts is incremented. Commonly three images are recorded that are each stepped in phase by $2\pi/3$. Mathematically, the intensity distribution of these temporally separated fringe patterns (in this example for three steps) may be donor bed by equation (1).

$$i_n(x,y) = a(x,y) + b(x,y)\cos[\phi(x,y) + 2\pi\Omega/3] \quad (1)$$

Where, $i_n$ (x,y)—nth recorded interferogram
a (x,y)—unmodulated background intensity
b (x,y)—fringe modulation depth
$\phi$ (x,y)—phase term describing the phase encoded in the fringes
n—integer denoting the number of phase steps Subsequently, the phase data at each pixel $\phi$ (x,y) may be extracted by applying equation 2.

$$\phi(x, y) = \tan^{-1}\left\{\sqrt{\frac{3[i_3(x, y) - i_2(x, y)]}{2i_1(x, y) - i_2(x, y) - i_3(x, y)]}}\right\} \quad (2)$$

In general, phase stepping is good at removing speckle noise and producing clean images from interferograms that have poor contrast. It is the preferred conventional method, with the exception that the three images have to be acquired sequentially over a period that is usually at least three frames times, that is 120 ms before and after object deformation. In practice, this duration is too long to study many important dynamic events and prevents the use of continuous-wave phase stepped interferometry in industrial environments with the exception of shearography in certain circumstances. Also, the need for multiple image captures prevents real-time phase map display unless multiple cameras are used which is impracticable.

The second known method involves superimposing the phase data on a spatial carrier wave, by changing the angle between the interfering wavefronts for the second exposure. Physically this produces a set of closely spaced parallel, that is, finite, fringes, that are specially perturbed by the phase data related to the object deformation. The required phase date is extracted by filtering the unmodulated information and demodulating the phase data by Fourier transform techniques.

The technique that superimposes the data on a spatial carrier is more versatile than phase stepping, because the interferometric phase date may be extracted from a single image. Consequently, if the angle between the interfering wavefronts can be changed between the image captures, either optically or digitally, in its undeformed and deformed conditions, then dynamic events may be studied. However, this usually requires the use of large, expensive and unreliable high power pulsed lasers and electro-optic beam switching of the reference beams. Also, the technique does not work well with noisy speckle images and the gross spatial filtering that is needed to clean up the images results in corruption of the required phase data.

OBJECTS OF THE INVENTION

Thus one object of the present invention is to provide an improved method for extracting low-noise phase information from a single interferogram, without the expense and inconvenience of pulsed laser technology.

This and other objects and advantages of the present invention will become more apparent from details disclosed in the following specification where preferred embodiments of the invention are described.

SUMMARY OF THE INVENTION

According to a first aspect of the present invention there is provided a method of inspecting or testing a sample by optical metrology, in which the sample is illuminated by scanning a line of coherent radiation across a surface of the sample, with zero shear in the direction of scan of the line of coherent radiation, to generate, via shearing element means, two laterally displaced images of the sample which are phase stepped by stepping or ramping the phase of one of the two images during each of the line scans so that successive lines are incremented in phase to encode temporally information about the sample in one frame, and in which the encoded information is decoded by running a vertical convolution mask over the encoded frame image.

This technique is applicable to many types of coherent optical processes such as holography, electronic speckle pattern interferometry (ESPI), speckle interferometry, particle image velocimetry (PIV), and shearography.

Preferably the radiation is provided by a laser source and the line of coherent radiation has substantially uniform intensity.

Conveniently the method utilises shearography in which the sample is observed by a video camera and in which the line of coherent radiation is scanned across the sample in synchronism with the frame scan of the camera.

Advantageously successive lines are incremented in phase by $$\frac{2\pi}{3}.$$

According to a second aspect of the present invention there is provided apparatus for inspecting or testing a sample by optical metrology, including a source of coherent radiation, means for forming a line of coherent radiation from the source, means for scanning the line of coherent radiation across the surface of a sample with zero shear in the direction of scan, shearing element means for generating two laterally displaced images of the sample, stepping or ramping means for stepping or ramping the phase of one of the two images during each of the line scans so that successive lines are incremented in phase to encode temporally information about the sample in one frame, and a vertical convolution mask for decoding the information in the encoded frame image.

Preferably the source of coherent radiation is a laser operable to provide a line of coherent radiation with substantially uniform intensity.

Conveniently the apparatus includes a video camera operable to view the sample and provide an output signal, a processor operable to receive the output signal and extract therefrom the frame rate of the camera, a first movable mirror forming part of the line scanning means for reflecting a line of laser radiation across the sample, and a second movable mirror attached to a PZT device operable in synchronism with the first movable mirror, with the processor being operable to synchronise the video scan frame rate with the rate at which the line of coherent laser radiation is scanned across the sample by the first movable mirror and the second movable mirror movement rate.

DESCRIPTION OF THE DRAWINGS

For a better understanding of the present invention, and to show how the same may be carried into effect, reference will now be made, by way of example, to the accompanying drawings in which.

DESCRIPTION OF EMBODIMENTS OF THE INVENTION

Figure 1:
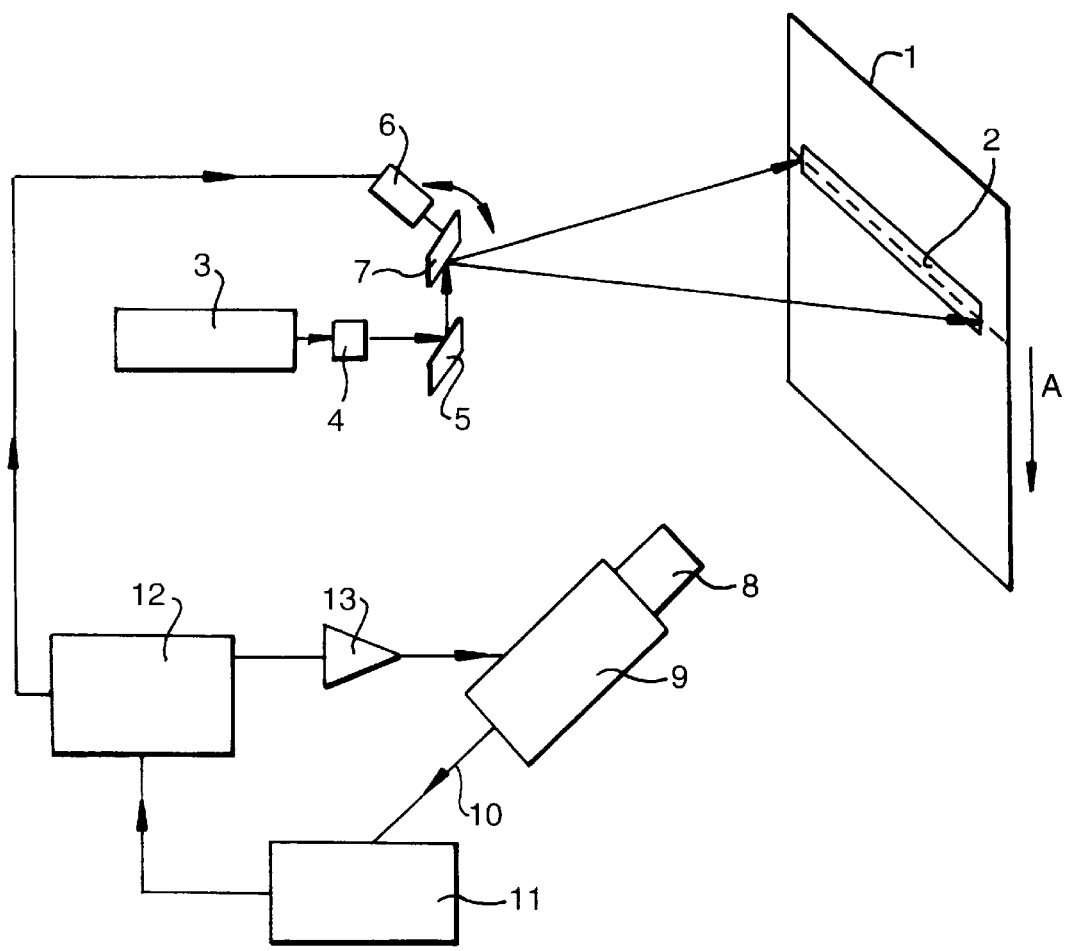
FIG. 1 is a diagrammatic representation of apparatus according to one aspect of the present invention for inspecting or testing a sample by optical metrology utilizing the method of the present invention.

A method and apparatus according to the present invention for inspecting or testing a sample by optical metrology is suitable for many coherent optical techniques such as holography, electronic speckle pattern interferometry, speckle interferometry, particle image velocimetry and shearography. These techniques are in turn suitable for employment in non-destructive testing, vibration analysis, object contouring, stress and strain measurement, fatigue testing, deformation analysis and fluid flow diagnosis. For the purposes of simplicity the method and apparatus will be described in terms of shearography for non-destructive testing of aerospace components such as aircraft skin panels.

A shearography system works by generating two laterally displaced images of a test sample such as 1. In practice this is achieved using a shearing element of which there are many variants, and imaging optics. When the sample 1 is illuminated using coherent radiation such as visible radiation from a laser, these twin images are modulated by a speckle pattern due to the high coherence of the light. These two images interfere to form a macroscopic speckle pattern, which may be recorded electronically using a charge couple device (CCD) and a frame store. Interferometric images or fringe patterns may be generated by subtracting two speckle patterns of the sheared twin image, where the second speckle pattern is recorded after the test specimen has been subjected to a stressing force, such as thermal, pressure or vibration. If an appropriate stressing force is applied defects in the structure of the sample are revealed by highly characteristic "figure of eight" fringes.

In practice the resulting fringe patterns are noisy due to spurious intensity variations and consequently the sensitivity of the technique is reduced. Many techniques have been proposed for suppressing such noise by extracting the phase difference between the sheared images from the interferograms. One proposed technique involves the capturing of a sequence of three or four fringe patterns by a camera and frame store which patterns have been successively incremented in phase with the three or four images then being processed mathematically in a computer to yield the phase image. This is difficult to implement and is not suitable for recording quick dynamic changes in the state of a sample and the present invention addresses the development of a hybrid phase extraction technique which has the advantages of single frame analysis coupled with the low noise properties of phase stepping, and the advantages of continuous wave operation.

Thus the method the present invention for inspecting or testing a sample 1 by optical metrology involves illuminating the sample 1 by scanning a line 2 of coherent radiation across a surface of the sample 1 which may be a sheet like sample as illustrated such as a metal or composite skin panel for an aircraft. The coherent radiation is provided by a laser source 3 operating via a line generator 4 to generate a line 2 of substantially uniform intensity. The line generator 4 can conveniently be a Lasiris line scanner which is commercially available.

The beam from the line generator 4 is passed to a reflective surface 5 and from thence to scanning means 6 which include a first movable mirror 7 whereby the line 2 can be moved up and down the sample 1 such as in the direction of the arrow A.

Figure 2:
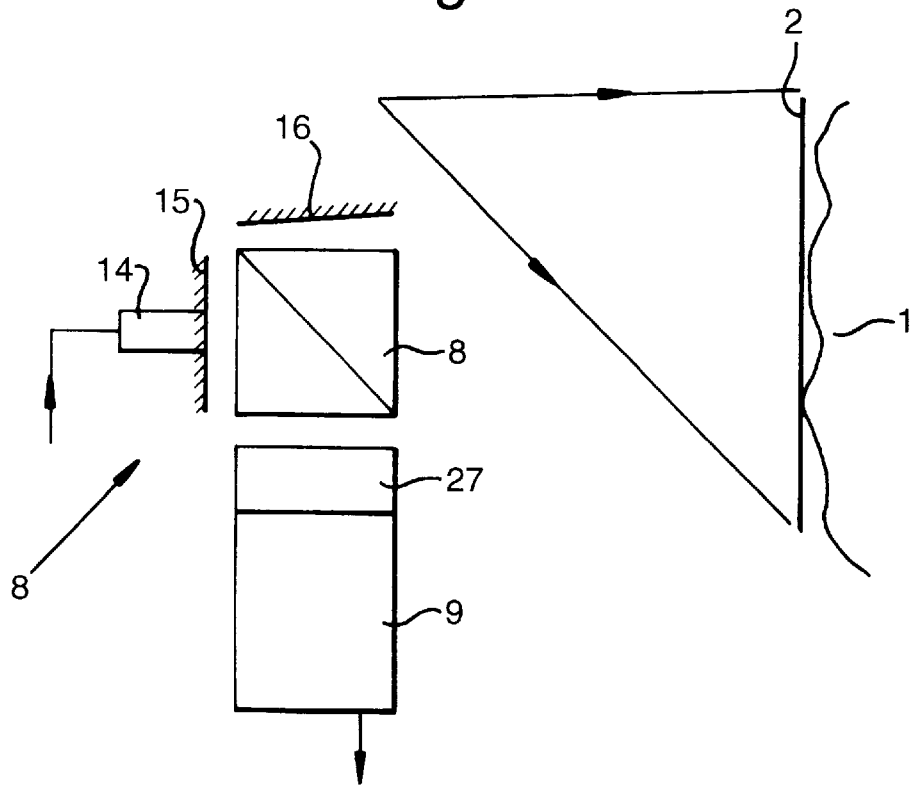
FIG. 2 is a diagrammatic view to an enlarged scale of a shearing head for use in the method and apparatus of the present invention according to the embodiment of FIG. 1.

As shown in FIG. 2 the apparatus of the invention also includes shearing element means generally indicated at 8 so that when the sample 1 is illuminated by scanning the line 2 across the sample 1 with zero shear in the direction of scan two laterally displaced images of the sample 1 are generated. The apparatus also includes a video camera 9 which conveniently is a charge couple device (CCD) imaging camera which way be used for shearography and for electronic speckle pattern interferometry. The camera 9 is operable to view the sample 1 via the shearing element 8 and provide an output signal 10. The apparatus also includes a processor 11 which receives the signal 10 and extracts the frame rate of the camera 9 which it synchronises with the rate at which the line of coherent radiation 2 is scanned in the direction across the sample 1 by the movable mirror 7. Preferably the line 2 is synchronised to the frame capture at 25 Hz or 50 Hz. Thus in effect the processor 11 yields frame synchronieing pulses which can be filtered to drive the movable mirror 7 directly so that the mirror 7 is synchronised to the video signal to yield a stable image on a monitor. As illustrated in FIG. 1 the filtered synchronising pulses can trigger a signal generator 12 which is used to drive the first movable mirror 7 and to provide a signal which is amplified by an amplifier 13 to drive a PZT (Piezo-Electric Transducer) device 14 in synchronism with the camera and line scanner.

The apparatus also includes a second movable mirror 15 and a tilted third mirror 16 to enable shearing. The second movable mirror 15 is attached to the PZT device 14 and is operable in synchronism with the first movable mirror. To this end the processor 21 is operable to synchronise the video scan frame rate with the rate at which the line of coherent laser radiation is scanned across a sample 1 by the first movable mirror 7 and with the second movable mirror 15 movement rate.

According to the method and apparatus of the present invention high quality phase information may be extracted from a single interferogram by a combination of both temporal and spatial encoding instead of just use of a single domain as used by phase stepped or Fourier processing. In effect the scanned illumination is used to smear three phase stepped images over successive scan lines of the camera 9 to provide access to the temporal domain from within a single image.

The two laterally displaced images of the sample are phase stepped by stepping or ramping the phase of one of the two images during each of the line scans so that successive lines are incremented in phase to encode temporally information about the sample in one frame. Preferably successive lines are incremented in phase by $$\frac{2\pi}{3}$$

for use of the three step phase extraction algorithm. For high scan frequencies where discrete steps are difficult to effect the phase may be ramped continuously with the date processed by an integrated bucket method.

Equation 2 is still used to calculate the phase when continuous phase ramping is used with the only difference being that the speckle modulation is reduced by 17%. In practice, the phase shifting can be implemented by the mirror 15 attached to a PZT device 14 which is driven in synchronism with the scanning mirror 7 (which in turn is synchronised with the CCD camera—see FIG. 2). To ensure that successive lines are incremented by $2\pi/3$, the amplitude d of the mirror deviation throughout one camera frame time is given by equation (3). A factor of two is included in the expression because the shearing interferometer is based on a double-pass Michelson geometry.

$$d = 2\lambda\left(\frac{v}{n}\right) \qquad (3)$$

Figure 3:
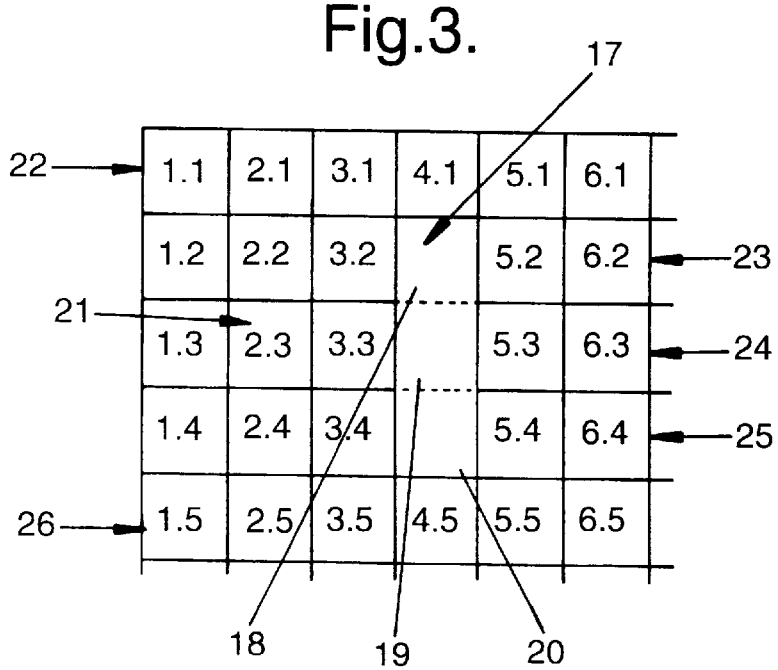
FIG. 3 is a diagrammatic illustration of a convolution mask as applied to image decoding according to the method of the present invention.

Where,

λ—wavelength of laser used v—height of the image in pixels n—number of phase steps used The resulting phase map images may be decoded by running a 1×3 vertical convolution mask 17 as shown in FIG. 3 over the image, with the three pixel values 18, 19, 20 respectively below the mask elements used as inputs ($i_1$ to $i_3$) to equation (2). Each successive TV line is phase stepped by $2\pi n/3$ and therefore, if the phase data is constant for all of the three pixels (by appropriate choice of speckle size), then the pixel at the centre of the mask can be replaced in the output image by the true wrapped phase value given by equation (2). A 1×3 convolution mask may be implemented within a single frame time, using current framestore technology and a programmed look-up-table (LUT), thereby enabling real-time phase map display from a single camera.

In FIG. 3, 21 generally shows the pixel co-ordinates, 22 shows a line phase stepped by zero, 23 shows a line phase stepped by $2\pi/3$, 24 shows a line phase stepped by $4\pi/3$, 25 shows a line phase stepped by $2\pi$, and 26 shows a line phase stepped by $8\pi/3$. Pixels 18, 19 and 20 represent the three phase stepped intensities $i_1$, $i_2$ and $i_3$ which can be utilised in equation (2) to extract the phase at pixel 18.

In the method and apparatus of the present invention practically all of the laser energy is delivered to the inspection area which enables low reflectivity surfaces to be inspected due to the increased laser power at the sample surface. Larger surface area samples may be inspected simultaneously due to the increased laser power. High accuracy beam alignment 18 unnecessary as is spatial filtering and launch optics are not used although a C-mount lens 27 may be provided on the camera 9. The signal to noise ratio is optimised over the whole field of view due to the uniformity of illumination and the width of the illumination may be adjusted by varying the amplitude of the oscillating scanning mirror 7. Additionally scanned illumination has the important property that the dwell time of the laser line 2 on each pixel is very short compared to the frame duration. For example if the image of the laser line on the sample 1 has a width of a single pixel on the camera 9 then the effective dwell time for a standard 50 Hz interlaced camera of resolution 512×512 is 40 ms/512 or 78 µs. This dwell time can be reduced to the duration of typical pulsed laser systems, that is sub-micro second, if faster framing cameras are utilised. With the method and apparatus of the present invention inexpensive and reliable continuous wave lasers may be utilised for studying dynamic events and for operation in harsh environments where previously a complex pulsed laser would have been necessary.

Various modifications and alterations may be made to the embodiments of the present invention described and illustrated, within the scope of the present invention as defined in the following claims.

What is claimed is:

1. A method of inspecting or testing a sample by optical metrology, in which the sample is illuminated by scanning a line of coherent radiation across a surface of the sample, with zero shear in the direction of scan of the line of coherent radiation, to generate, via shearing element means, two laterally displaced images of the sample which are phase stepped by stepping or romping the phase of one of the two images during each of the line scans so that successive lines are incremented in phase to encode temporally information about the sample in one frame, and in which the encoded information is decoded by running a vertical convolution mask over the encoded frame image.

2. A method according to claim 1 in which the radiation is provided by a laser source and in which the line of coherent radiation has substantially uniform intensity.

3. A method according to claim 2, utilizing shearography, in which the sample is observed by the video camera and in which the line of coherent radiation is scanned across the sample in synchronism with the frame scan of the camera.

4. A method according to claim 3, in which successive lines are incremented in phase by $2\pi/3$.

5. Apparatus for inspecting or testing a sample by optical metrology, including a source of coherent radiation, means for forming a line of coherent radiation from the source, means for scanning the line of coherent radiation across the surface of a example with zero shear in the direction of scan, shearing element means for generating two laterally displaced images of the sample, stepping or ramping means for stepping or ramping the phase of one of the two images during each of the line scans 80 that successive lines are incremented in phase to encode temporally information about the sample in one frame, and a vertical convolution mask for decoding the information in the encoded frame image.

6. Apparatus according to claim 5, wherein the source of coherent radiation is a laser operable to provide a line of coherent radiation with substantially uniform intensity.

7. Apparatus according to claim 6, including a video camera operable to view the sample and provide an output signal, a processor operable to receive the output signal and extract therefrom the frame rate of the camera, a first movable mirror forming part of the scanning means for reflecting a line of laser radiation across the sample, and a second movable mirror attached to a PZT device operable in synchronism with the first movable mirror, with the processor being operable to synchronise the video scan frame rate with the rate at which the line of coherent laser radiation is scanned across the sample by the first movable mirror and the second movable mirror movement rate.

* * * * *